United States Patent [19]
Lang

[11] Patent Number: 5,158,126
[45] Date of Patent: Oct. 27, 1992

[54] IMPROVEMENTS IN TREE STUMP GRINDERS AND METHODS OF GRINDING TREE STUMPS

[76] Inventor: William J. Lang, 2540 Glidden Rd., Beaverton, Mich. 48612

[21] Appl. No.: 797,785

[22] Filed: Nov. 25, 1991

[51] Int. Cl.$^5$ .............................................. B27C 9/00
[52] U.S. Cl. ................................ 144/375; 144/2 N; 144/363; 241/101.7; 241/191; 241/292.1
[58] Field of Search ............... 241/101.7, 191, 292.1, 241/277, 293; 144/2 N, 363, 373, 375

[56] References Cited

U.S. PATENT DOCUMENTS

| | | |
|---|---|---|
| 346,681 | 8/1886 | Perry . |
| 564,747 | 7/1896 | Gutenkunst . |
| 578,234 | 3/1897 | Gutenkunst . |
| 3,018,972 | 1/1962 | Steinmetz . |
| 3,198,224 | 8/1965 | Hiley . |
| 3,389,726 | 6/1968 | Good . |
| 3,868,980 | 3/1975 | Blum . |
| 3,931,841 | 1/1976 | Blum . |
| 3,937,261 | 2/1976 | Blum ........................... 144/2 N |
| 4,041,996 | 8/1977 | Grover ......................... 144/2 N |
| 4,271,879 | 6/1981 | Shivers et al. ................ 144/2 N |
| 4,339,908 | 7/1982 | Johnson . |

FOREIGN PATENT DOCUMENTS

| | | |
|---|---|---|
| 816429 | 4/1981 | U.S.S.R. ........................ 144/2 N |
| 908283 | 2/1982 | U.S.S.R. . |

*Primary Examiner*—W. Donald Bray
*Attorney, Agent, or Firm*—Learman & McCulloch

[57] ABSTRACT

The tree stump grinder is adapted to be attached to a backhoe or an excavator with a boom and a stick. The tree stump grinder includes a yoke which is pivotally secured to the stick. A hydraulic grinder swing cylinder is provided to pivot the yoke relative to the stick. Fixed stub shafts are secured to arms of the yoke. Circular end plates are attached to the respective hubs. One hub is rotatably journaled on one stub shaft and the other hub is rotatably journaled on the other stub shaft. A hydraulic motor is fixed to one stub shaft and drives the other hub. A grinder drum is attached to the circular end plates and encloses the hydraulic motor. Oil is supplied to the hydraulic motor through passages in one of the stub shafts. A plurality of block and bit assemblies are attached to the outside surface of the grinder drum. An anchor assembly is also pivotally attached to the stick. A hydraulic anchor cylinder is connected to the stick and the anchor assembly for pivoting the anchor assembly relative to the stick. Hydraulic fluid is supplied to rotate the grinder drum and to position the anchor assembly and the yoke.

20 Claims, 5 Drawing Sheets

IMPROVEMENTS IN TREE STUMP GRINDERS AND METHODS OF GRINDING TREE STUMPS

FIELD OF THE INVENTION

The invention relates to a machine for clearing land, and more particularly to an attachment mounted on an excavator which grinds tree stumps and tree roots, and to a method of grinding large tree stumps.

BACKGROUND OF THE INVENTION

In the past, land has been cleared for agricultural, industrial and housing purposes by removing tree stumps and tree roots. Large tractors have been used to remove tree stumps and roots from the ground. After removal from the ground, tree stumps and roots have been piled for burning, or they have been hauled away for disposal. Disposal at a remote location has been by burial, or by burning.

Environmental concerns, government requirements and cost have made it necessary to find other methods for clearing land. One method for land clearing is to grind tree stumps and roots into a mulch and leave the mulch in the ground where the tree stumps and roots were originally. This procedure eliminates transportation costs and disposal costs. Leaving a ground wood mulch on the ground improves soil fertility.

Tree stump grinders have been used to grind tree stumps following the removal of a tree from areas near buildings or other areas where it is desirable to minimize disturbance of the surface. Some of these stump grinders and other prior structures are disclosed in the following patents:

| | |
|---|---|
| 3,198,224 | Hiley |
| 3,389,726 | Good |
| 3,868,980 | Blum |
| 3,937,261 | Blum |
| 3,931,841 | Blum |
| 4,041,996 | Grover |
| 4,339,908 | Johnson |

The prior stump machines generally comminute the portion of a stump that is above the ground and the portions which are near the surface. They grind up sufficient material to allow soil to cover the remaining stump and for grass to be planted. Such stump grinders generally do not remove all of a stump or tree roots. Stump grinders designed to grind the portion of a stump that is close to the surface are relatively slow.

The stump grinder disclosed by Grover was designed for land clearing, but is believed to be operative for smaller stumps because its hydraulic motor supports the grinding drum. Stump grinders similar to those disclosed by the above mentioned patentees have, in my opinion, major drawbacks. The drawbacks I perceive include being difficult to control, having insufficient capacity for the size and cost of the machine, having poor durability requiring expensive repairs, the inability to efficiently locate and grind tree roots, and the predisposition to frequent failures when working in difficult conditions.

SUMMARY OF THE INVENTION

The object of the invention is to provide a tree stump grinder which can quickly and efficiently grind any size tree stumps and roots that are in the ground where they grew.

Another object of the invention is to provide a tree stump grinder with a grinder assembly in combination with an associated anchor assembly that can be manipulated to increase the capacity and improve the control of a tree stump grinder.

A further object of the invention is to provide a drive for a tree stump grinder subjected only to driving torque, and that is isolated from shear loads and bending loads exerted on a stump grinder drum and drum support.

A still further object of the invention is to provide a tree stump grinder having grinding bits that can be replaced quickly in the field.

The tree stump grinder is an attachment that is preferably mounted on a vehicle such as an excavator or a backhoe. The vehicle can be supported on wheels or tracks. A boom is pivotally connected to the vehicle frame. Hydraulic boom cylinders are attached to the vehicle frame and to the boom to pivot the boom about its pivotal connection to the vehicle frame. A stick is pivotally attached to the boom. A hydraulic cylinder is connected to the boom and to the stick for pivoting the stick about its pivotal connection to the boom.

The stump grinder assembly includes a yoke member pivotally attached to the stick. A stump grinder drum is rotatably supported by the yoke. A hydraulic motor is mounted inside the drum and is connected to the drum to apply torque which rotates the drum. Grinding bits are secured to the outside surface of the drum. A grinder hydraulic swing cylinder is connected to the stick and to the yoke for pivoting the yoke about its pivotal attachment to the stick.

An anchor assembly is also pivotally attached to the stick. An anchor hydraulic cylinder is attached to the stick and the anchor assembly for pivoting the anchor assembly about its pivotal connection to the stick. In operation, the anchor assembly enters the ground on one side of a stump that is to be ground to anchor the stick. The anchor and grinder hydraulic cylinders then cooperate to control the force holding the grinder drum against tree stumps and other material that is being ground. The anchor assembly can also hold material that is loose during grinding.

Other objects and advantages of the invention will become more apparent from the following description when it is considered in conjunction with the accompanying drawings.

THE DRAWINGS

DETAILED DESCRIPTION

Figure 1:
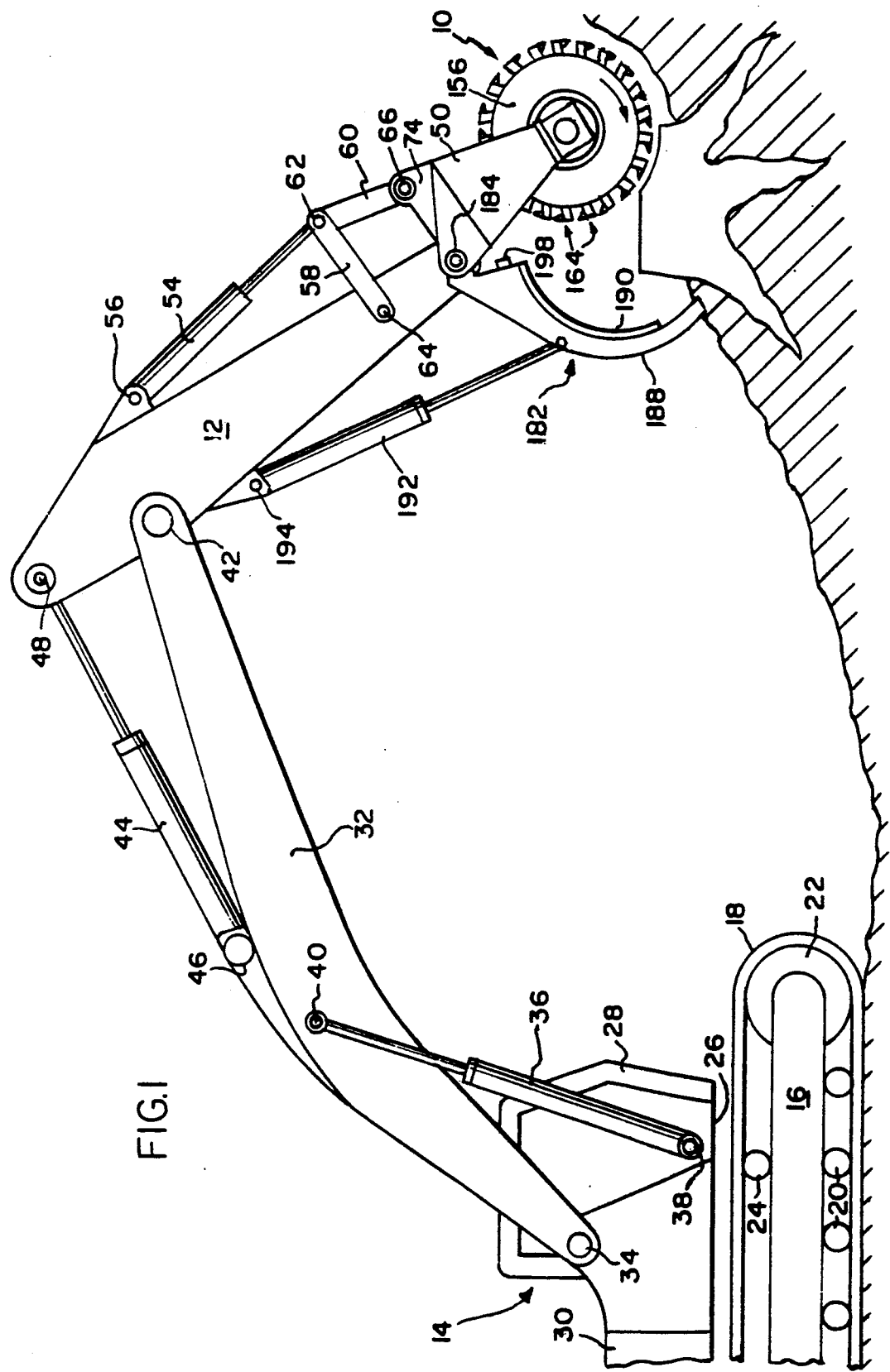
FIG. 1 is a side elevational view of a portion of an excavator with a stump grinder assembly and an anchor assembly attached to the excavator boom and stick.

The tree stump grinder 10 is mounted on the stick 12 of an excavator 14. The excavator 14, a portion of which is shown in FIG. 1, includes a base frame 16. The base frame 16 is supported by a pair of track assemblies 18, track rollers 20, idler wheels 22, track carrier rollers 24 and drive sprockets (not shown). A swing frame 26 is connected to the base frame 16 by a trunnion which allows the swing frame 26 to pivot about a generally vertical axis relative to the base frame 16. An operator's cab 28 is mounted on one side of the swing frame 26. An engine compartment 30 is also mounted on the swing frame 26. The engine compartment 30 houses an internal combustion engine. The internal combustion engine drives hydraulic oil pumps which drive the tracks and provide power to perform all the other standard excavator functions. Valves for directing hydraulic oil are controlled from the operator's cab 28.

A boom 32 is pivotally attached to the swing frame 26 by a pivot pin 34. A pair of hydraulic boom cylinders 36 are connected to the swing frame 26 by pins 38 and to the boom 32 by support pins 40. The operator can direct hydraulic oil to and from the double acting hydraulic boom cylinders 36 to pivot the boom 32 about the axis of pivot pin 34 to raise and lower the free end of the boom.

A stick 12 is pivotally attached to the free end of the boom 32 by a pivot pin 42. A double acting hydraulic stick cylinder 44 is connected to the boom 32 by a pin 46 and to the stick 12 by a pin 48. A valve controlled from the operator's cab can direct oil to and from the hydraulic stick cylinder 44 to pivot the stick 12 relative to the boom 32 about the axis of the pivot pin 42.

The tree stump grinder 10 includes a yoke 50 which is pivotally attached to the stick 12 by a pivot pin 52 carried by bracket bearings 52a. A double acting hydraulic grinder swing cylinder 54 is attached to the stick 12 by a pin 56. The hydraulic grinder swing cylinder 54 is also attached to a pair of links 58 and to links 60 by a pin 62. The links 58 are attached to the stick 12 by a pin 64. The links 60 are attached to the yoke 50 by a pin 66. Oil can be directed by a valve, controlled from the operator's cab, to and from the hydraulic grinder swing cylinder 54 to pivot the yoke 50 about the axis of the pivot pin 52. The links 58 increase the range of movement of the yoke 50 about the axis of the pivot pin 52 and increase the force available to pivot the yoke 50 in some portions of the yoke's range of movement The hydraulic grinder swing cylinder 54, the links 58 and the links 60 are standard parts of an excavator 14 that normally controls a bucket attached to the stick 12 during use of the support vehicle as an excavator.

Figure 2:
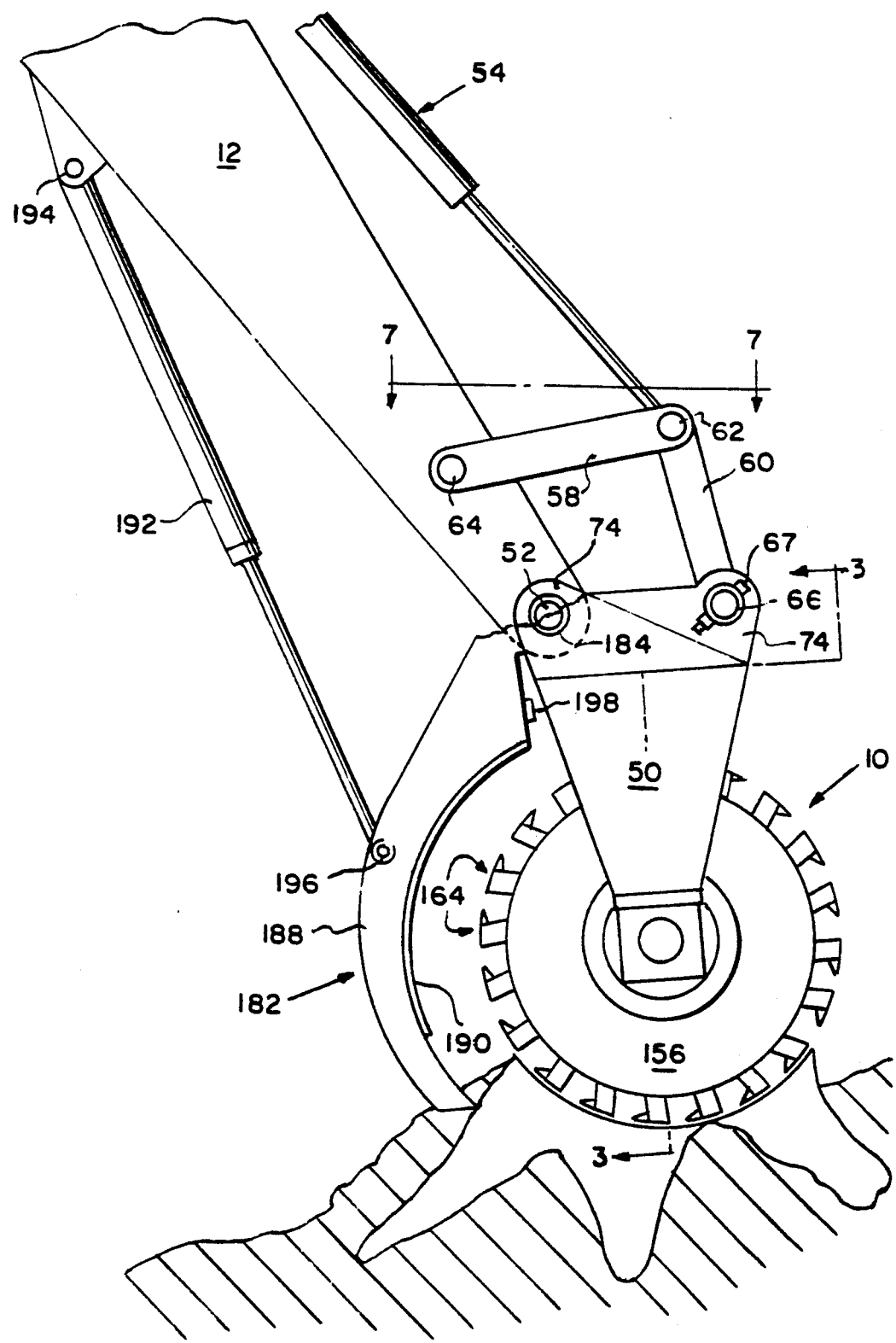
FIG. 2 is an enlarged, side elevational view of the lower portion of the stump grinder and anchor assembly.
Figure 3:
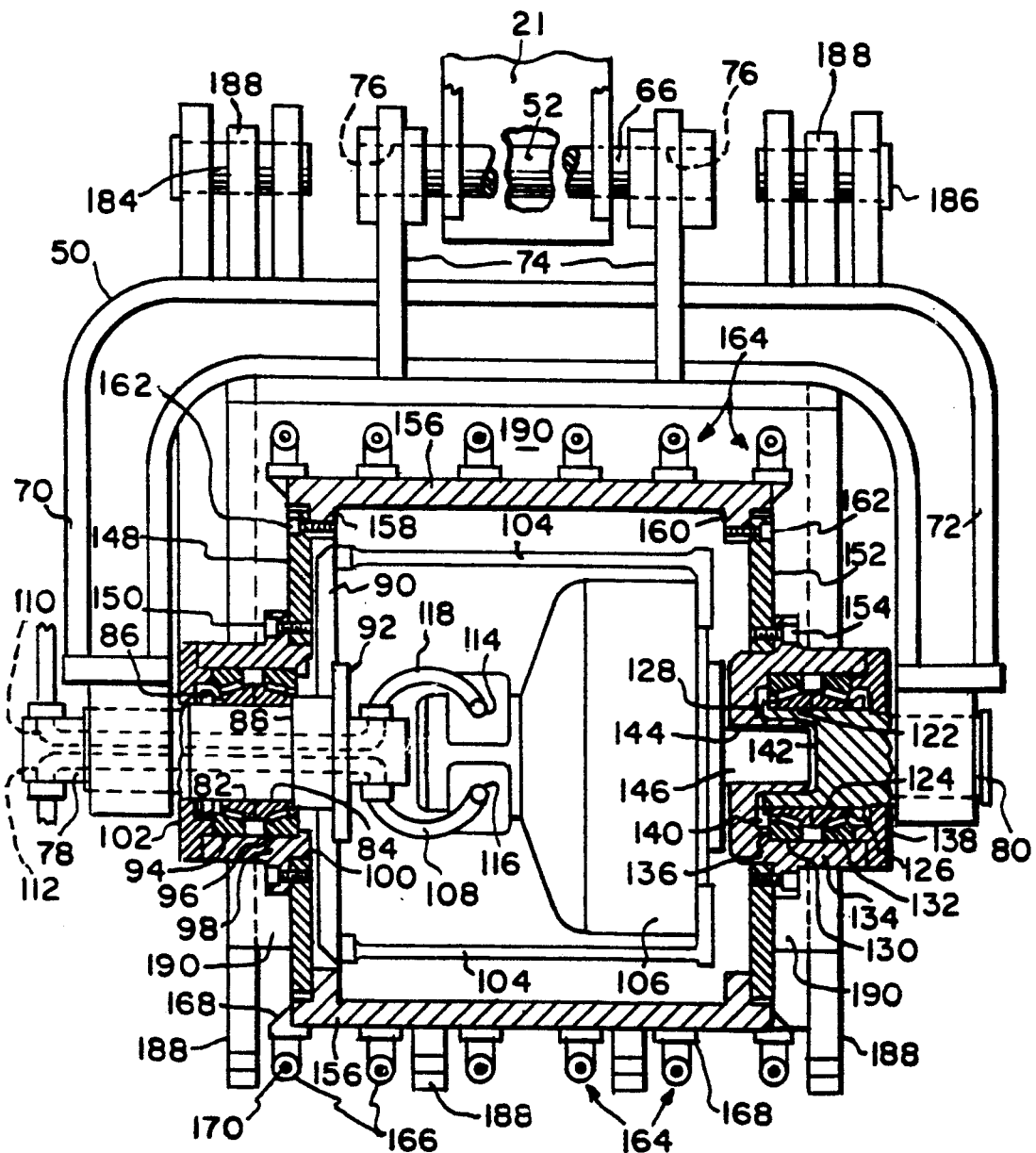
FIG. 3 is a cross sectional view of the stump grinder drum taken along the line 3—3 of FIG. 2, with the yoke and the anchor assembly attached.
Figure 4:
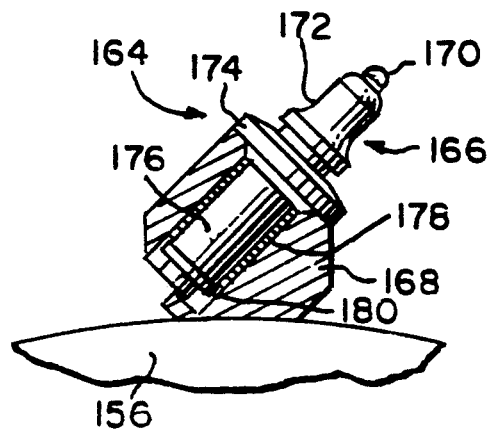
FIG. 4 is an enlarged side elevational view of one bit and block assembly and a portion of the grinder drum, with portions of the block broken away to expose the bit.

The yoke 50, as shown in FIG. 3, has a center portion 68 and a pair of arms 70 and 72. A pair of plates 74, with bores 76, are rigidly secured to the center portion 68 of the yoke 50. The bores 76 accept the pin 66 to attach the yoke 50 to the links 60. A second pair of bores 77 through the plates 74 accept pivot pin 52 to attach the yoke 50 to the stick 12. The second pair of bores 77 for the pivot pin 52 are directly behind the bores 76, as shown in FIG. 3, and in axial alignment with the pin 184 shown in FIGS. 1 and 2.

First and second stub shafts 78 and 80 pass through bores in the arms 70 and 72 of the yoke 50. The first stub shaft 78 is rigidly secured to the arm 70 of the yoke 50. The inner races 82 and 84 of a pair of tapered roller bearings are secured to the first stub shaft 78 by a nut 86. The nut 86 clamps the inner races 82 and 84 against a flange 88. A disk 90 is secured to a flange 92 on the first stub shaft 78 by bolts (not shown). The outer races 94 and 96 of the tapered roller bearings are held in a hub 98. The outer race 96 is positioned against a partial end wall 100 of the hub 98. The outer race 94 is positioned by a hub end cap 102. The end cap 102 is secured to the hub 98 by bolts (not shown). The tapered roller bearings can be adjusted by placing shims if required between the outer race 94 and the end cap 102. Seals (not shown) are provided to keep grease in the tapered roller bearings, and to keep dirt out.

A plurality of motor supports 104 are bolted to the disk 90. A hydraulic motor 106 is secured to the motor supports 104. Pipes 108 and 118 connect passages 110 and 112 through the first stub shaft 78 to ports 114 and 116 in the hydraulic motor 106.

A second stub shaft 80 is rigidly secured to the arm 72 of the yoke 50. The inner races 122 and 124 of a pair of tapered roller bearings are secured to the second stub shaft 80 by a nut 126. The nut 126 clamps the inner races 122 and 124 against a flange 128. The outer races 130 and 132 of the tapered roller bearings are held in a hub 134. The outer race 130 is positioned against an end wall 136 in the hub 134. The outer race 132 is positioned by a hub end cap 138. The end cap 138 is secured to the hub 134 by bolts (not shown). The tapered roller bearings can be adjusted by placing shims, if required, between the outer race 132 and the end cap 138. Seals (not shown) are provided to keep grease in the tapered roller bearings, and to keep dirt out.

The hub end cap 138 of the hub 134 has a hollow shaft portion 140 which extends into a bore 142 in the second stub shaft 80. The bore 142 can be provided with a bushing for the shaft portion 140 if desired. The hollow shaft portion 140 has internal splines 144 which receive the splined output shaft 146 of the hydraulic motor 106.

A circular end plate 148 with a central bore is fastened to the hub 98 by bolts 150. Another circular end plate 152 with a central bore is fastened to the hub 134 by bolts 154. A grinder drum 156 with radially extending internal end flanges 158 and 160 is secured to the circular end plates 148 and 152 by bolts 162.

A plurality of bit and block assemblies 164 are secured to the outside surface of the grinder drum 156. Each bit and block assembly 164 includes a bit 166 and a block 168. The blocks 168 are attached to the surface of the grinder drum 156 in any desired pattern by welding. The bit 166 includes a carbide tip 170, a conical steel section 172, a block protector flange 174 and a shank 176. A spring steel retainer sleeve 178 surrounds the shank 176. The bit 166 may be forced into a bore 180 in the block 168 by blows from a hammer. As the shank 176 is driven into the bore 180 in the block 168, the spring steel retainer sleeve 178 is compressed. The spring steel retainer sleeve 178 exerts a force against the walls of the bore 180 to retain the bit 166 in the block 168. When a bit 166 becomes worn or broken, the shank 176 is driven from the bore 180 by sticking a punch into the rear of the bore 180 and hitting it with a hammer.

The bores 180 in the blocks 168 are at an angle relative to a radius of the grinder drum 156 which results in the carbide tips 170 contacting material to be ground first during rotation of the grinder drum 156.

An anchor assembly 182 is pivotally attached to the stick 12 by the pivot pins 184 and 186. The pivot pins 184 and 186 are in axial alignment with the pivot pin 52 which attaches the yoke 50 to the stick 12. Ideally, the pins 184 and 186 are slightly larger in diameter than the pin 52. This difference in the diameter of the pins 52, 184 and 186 and the bores through which they pass facilitates insertion and removal of pin 52. The pins are locked in place by suitable locking members such as the bolt 67 which locks the pin 66 in place as shown in FIG. 2. The anchor assembly 182 includes four shanks 188. The four shanks are connected together by a plate 190. The shanks 188 extend out past the lower edge of the plate 190. The plate 190 acts as a shield to keep the stump grinder 10 from throwing ground material against the operator's cab 28. The plate 190 also helps hold brush roots and other material so that it can be ground by the stump grinder 10. A further function of the plate 190 is to act as a small dozer blade to move or level dirt and tree stump grindings. The shanks 188 extend past the plate 190 so that they can enter the ground to function as anchors. They can also be used to locate and rake up roots and other material to be ground by the stump grinder 10. The number of shanks 188 can be varied as required One shank 188 would be sufficient to anchor the stick 12 in some cases.

A double acting hydraulic anchor cylinder 192 is connected to the stick 12 by a pin 194. The hydraulic anchor cylinder 192 is also connected to the anchor assembly 182 by a pin 196. The hydraulic anchor cylinder 192 is operable to pivot the anchor assembly 182 about the axis of the pivot pin 52. A stop bar 198 is welded to the shanks 188 The stop bar 198 contacts the yoke 50 to prevent the bit and block assemblies 164 from contacting the plate 190 and damaging the anchor assembly 182. The anchor assembly 182 could also be pivotally attached to the stick 12 or the yoke 50 for pivotal movement about an axis that is offset from the axis of the pin 52 which connects the yoke 50 to the stick 12.

During tree stump grinding operations, the hydraulic grinder swing cylinder 54 pivots the yoke 50 to move the grinder drum 156 away from the anchor assembly 182. The anchor assembly 182 is then positioned in a desired location by manipulating the boom 32 with the hydraulic boom cylinders 36, the stick 12 with the hydraulic stick cylinder 44 and the anchor assembly 182 with the hydraulic anchor cylinder 192. The anchor assembly 182 is normally positioned with the shanks 188 embedded in the ground and in contact with the side of a tree stump to be ground. With the anchor assembly embedded in the ground and in contact with a tree stump, the stick 12 is held in a relatively fixed position By holding the stick 12 in a relatively fixed position, the hydraulic boom cylinders 36 and the hydraulic stick cylinder 44 are isolated from a substantial portion of the forces exerted on the grinder drum 156. It is also possible to hold the stick 12 in a fixed position by engaging a tree stump above the ground or by merely forcing the shanks 188 into firm ground. The yoke 50 is pivoted about the axis of the pin 52, after the anchor assembly 182 anchors the stick 12, and the grinder drum 156 is moved toward the anchor assembly 182 by the grinder swing cylinder 54. As the grinder drum 156 is rotated by the hydraulic motor 106 and is moved toward the anchor assembly 182, a tree stump between the grinder drum 156 and the anchor assembly 182 is engaged by the bits 166 held on the outer surface of the grinder drum 156 by the blocks 168 and the tree stump is ground. When the stop bar 198 contacts the yoke 50, hydraulic grinder swing cylinder 54 is reversed and the grinder drum 156 is pivoted away from the anchor assembly 182. With the grinder drum 156 moved to a position away from the anchor assembly 182, the anchor assembly 182 is repositioned. The repositioning can include a movement to one side if the tree stump is large in diameter or it can be a lowering of the yoke 50 toward the unground portion of the tree stump. After the anchor assembly is repositioned, the hydraulic grinder swing cylinder 54 is activated to move the grinder drum 156 arcuately toward the anchor assembly 182 again to grind more of a tree stump. Repositioning of the anchor assembly 182 and grinding passes by the grinder drum 156 continue until the tree stump and associated major roots are completely ground.

The stump grinder 10 grinds tree stumps faster if the grinder drum 156 and the bits 166 are forced toward the tree stump being ground. The grinder swing cylinder 54 can place a substantial load on the grinder drum 156 and essentially squeeze tree stumps and other material between the grinder drum 156 and the anchor assembly 182. The force exerted on the grinder drum 156 and the bits 166 by the grinder swing cylinder 54 to force the grinder drum and the bits into contact with tree stumps to be ground can be several tons depending on the hydraulic force available During operation the rotating grinder drum 156 and the bits 166 will dig holes in the soil and rocks while grinding tree stumps and roots. If the load exerted on the grinder drum 156 is too large, the grinder drum 156 will be driven at a slower speed by the hydraulic motor 106 and may even stop. The hydraulic grinder swing cylinder 54 can be easily manipulated to control the pressure on the grinder drum 156 so that it continues to rotate and maintain a high rate of grinding.

The flow of hydraulic oil to and from the hydraulic motor 106 can be stopped to prevent the grinder drum 156 from rotating. With the grinder drum 156 in a non-rotating condition, logs, tree stumps and other objects can be clamped between the grinder drum 156 and the anchor assembly 182 by manipulating the hydraulic anchor cylinder 192 and the hydraulic grinder swing cylinder 54. Once a tree stump, a log or other object is clamped between the anchor assembly 182 and the grinder drum 156, it can be lifted and moved by directing hydraulic oil to the proper end of the boom cylinders 36 and the hydraulic stick cylinder 44.

The anchor assembly 182 can be moved by the hydraulic anchor cylinder 192 to positions in which it can be forced under a tree stump, as well as being positioned to one side of a tree stump. The grinder hydraulic swing cylinder 54 can pivot the yoke 50 about the axis of pivot pin 52 through a similar range of movement so that the grinder drum can move in an arc generally vertically downward, horizontally or generally upwardly while grinding tree stumps. This wide range of movement of the anchor assembly 182 and the grinder drum 156 is very useful when clearing rough land with steep grades, ravines, large rocks and other obstructions.

After a tree stump is ground, the anchor assembly 182 and the shanks 188 can be moved through the soil to find tree roots and hold the tree roots for grinding.

After the tree stump and roots are ground, the hydraulic grinder cylinder 54 pivots the stump grinder 10 up and away from the ground. The anchor assembly 182 then can be used as a dozer blade for filling the holes ground in the earth and leveling the surface. The excavator 14 is then moved to the next tree stump to be ground.

The boom 32 and the stick 12 have a large movement range which makes it possible to grind tree stumps and other material up on steep slopes and in deep ditches while keeping the excavator on good footing.

Figure 6:
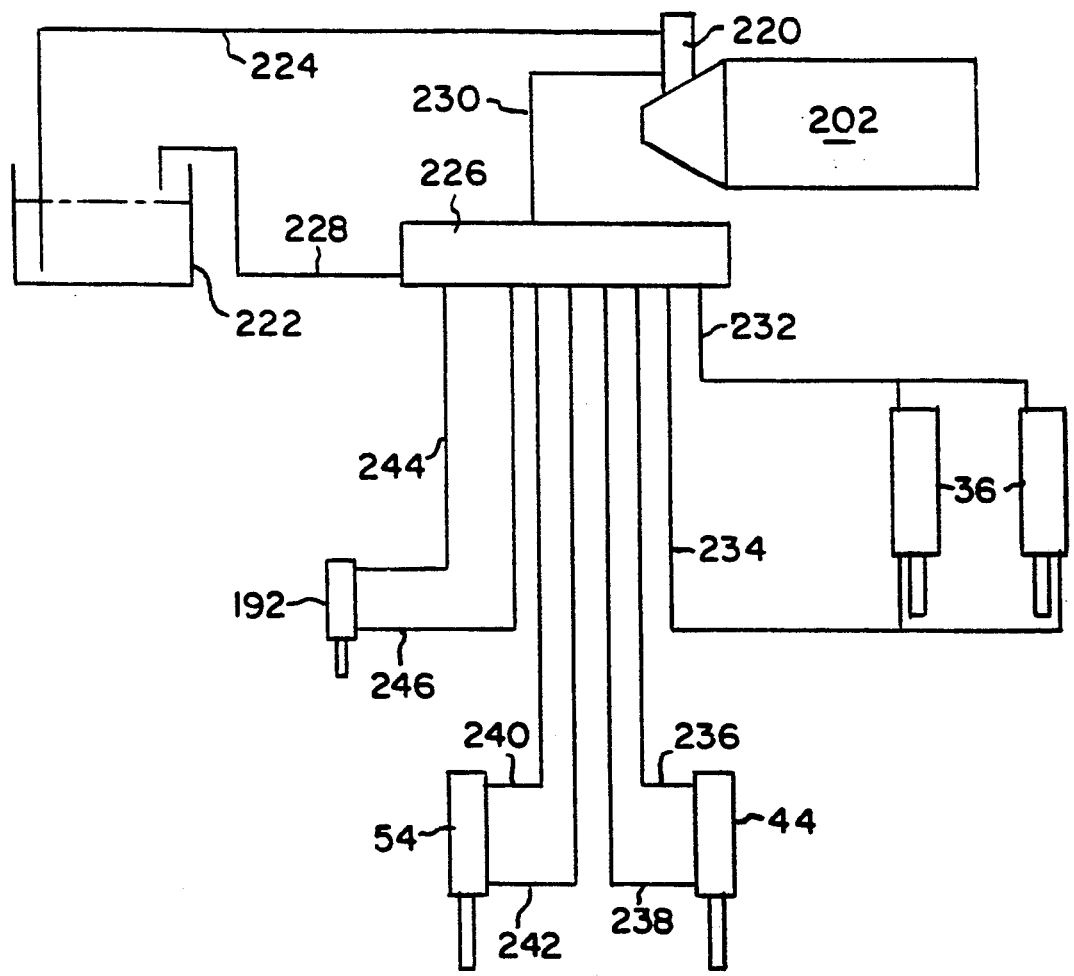
FIG. 6 is a schematic hydraulic system for controlling the hydraulic functions found on many excavators.

The hydraulic boom cylinders 36, the hydraulic stick cylinder 44, the hydraulic grinder cylinder 54, and the hydraulic anchor cylinder 192 are all connected to the hydraulic system that is standard on the excavator 14. No modifications are required in the hydraulic system to control these cylinders. A simplified hydraulic system which could be used for the standard excavator hydraulic system is illustrated in the schematic shown in FIG. 6. The system includes a gear driven hydraulic pump 220 mounted on the flywheel housing of an internal combustion engine 220. The pump moves hydraulic fluid from a sump 222 through a line 224 and delivers the fluid under pressure to a valve block 226 through a line 230. The valve block 226 is a standard commercially available block with an internal fluid inlet manifold, the number of spool valves that are required, outlet ports for conveying oil to the various linear and rotary actuators and a return fluid manifold for directing hydraulic fluid to the sump 222. Return hydraulic fluid is conveyed from the return manifold in the valve block 226 through a line 228.

Hydraulic fluid pressure is directed from the valve block 226 to the head end of a pair of side-by-side hydraulic boom cylinders 36 by line 232 or to the rod end of hydraulic boom cylinders 36 through line 234. Hydraulic fluid under pressure is directed from the valve block 226 to the head end of the hydraulic stick cylinder 44 through line 236 or to the rod end of the hydraulic stick cylinder 44 through line 238. Hydraulic fluid under pressure is directed from the valve block 226 to the head end of the hydraulic swing cylinder 54 through line 240 or to the rod end of the hydraulic swing cylinder 54 through line 242. Hydraulic fluid under pressure is directed from the valve block to the head end of the hydraulic anchor cylinder 192 through a line 244 or to the rod end of the hydraulic anchor cylinder through a line 246. Return hydraulic fluid from the cylinders 36, 44, 54 and 192 is directed to the sump 222 by the valve block 226 through line 228.

The spool valves in the valve block 226 can be operated from the operator's cab 28 by mechanical linkages, solenoids or linear actuators. The linear actuators can be operated hydraulically or pneumatically.

Figure 5:
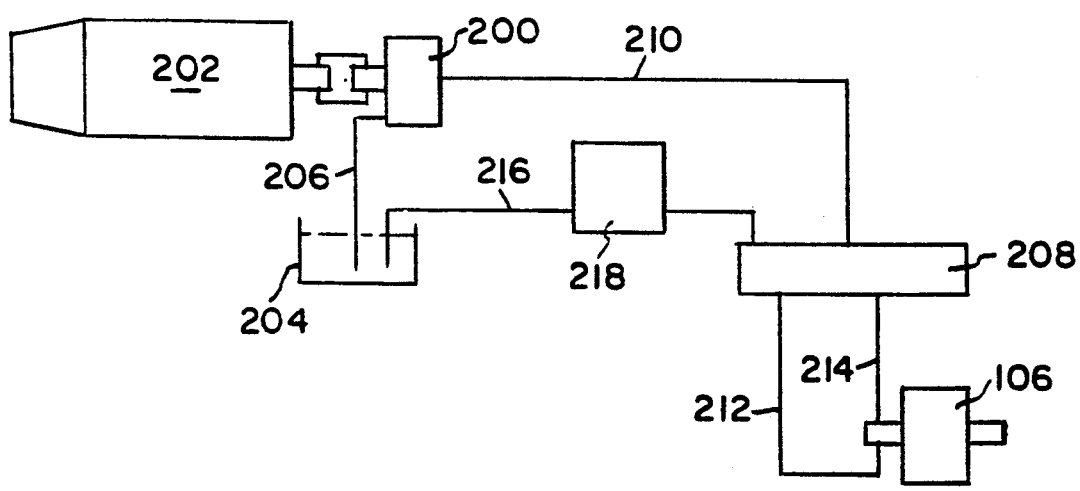
FIG. 5 is a schematic hydraulic system for driving the stump grinder drum.
Figure 7:
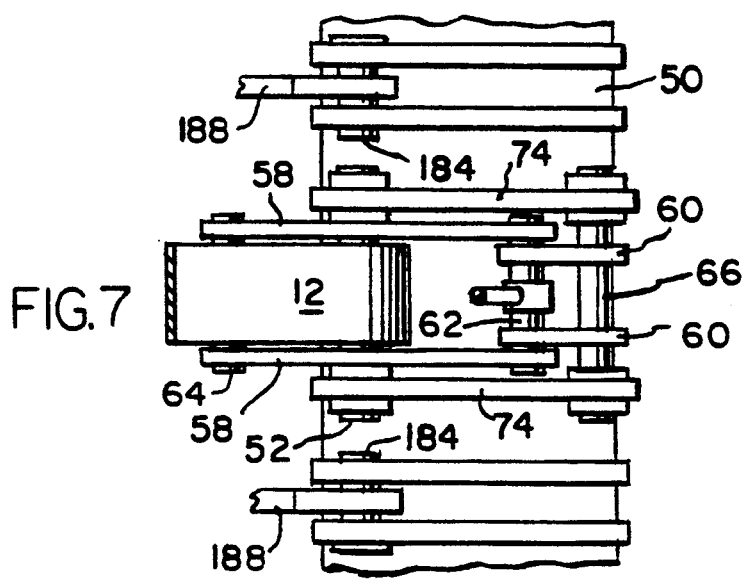
FIG. 7 is a sectional view taken along line 7—7 of FIG. 2 showing the mounting system for pivotally attaching the stump grinder and the anchor assembly to an excavator stick, and showing the linkage for pivoting the stump grinder relative to the excavator stick.

A separate hydraulic system is provided to drive the hydraulic motor 106. The power requirements for driving the grinder drum 156 are substantial and dependance upon the standard excavator hydraulic system may otherwise limit the drive capacity of the motor 106. FIG. 5 shows a simplified hydraulic system which could be used to drive the hydraulic motor 106. The system includes a hydraulic pump 200 driven by the excavator engine 202. The pump 200 moves oil from a sump 204 through a line 206 and delivers the oil to a control valve 208 through a line 210. The control valve 208 is any one of a number of types of commercially available valves that can be manipulated to direct oil from the pump 200 to the hydraulic motor 106 through line 212 or 214 depending upon the direction of rotation of the hydraulic motor 106. It is desirable to be able to reverse the hydraulic motor 106 in the event that something becomes wound around the grinder drum 156. The line 212 or 214 which is not carrying oil to the hydraulic motor 106 carries return oil to the valve 208. The valve 208 can also direct the return oil from the hydraulic motor 106 to the sump 204 through a line 216. Substantial heat is generated in the oil during operation of the stump grinder 10. A cooler 218 is provided to cool the oil. The cooler 218 can be located in several positions in the hydraulic system. The cooler 218 is shown in FIG. 5 in the line 216 between the valve 208 and the sump 204. The line 216 is a low pressure line. The hydraulic system used to drive the hydraulic motor 106 is a commercially available system that provides a substantially constant pressure and provides oil flow to meet the demand.

The tree stump grinder 10 is disclosed above as an attachment to an excavator 14. The excavator can move the stump grinder drum 156 and the anchor assembly 182 vertically and horizontally. The stump grinder 10 could be mounted on a carrier other than an excavator 14. The carrier would, however, have to be capable of moving the stump grinder 10 vertically and horizontally into a position in which the yoke 50 can be pivoted about the axis of pivot pin 52 to grind tree stumps.

The invention has been described in detail in connection with a preferred embodiment Some of the details will vary depending upon the design, capabilities and limitations of the excavator or other machine to which the stump grinder 10 and anchor assembly 182 are attached. The preferred embodiment is therefore an example only and the invention is not restricted thereto. Those skilled in the art will understand that variations and modifications can be made within the scope of the invention.

I claim:

1. A tree stump grinder for comminuting tree stumps in the ground including a frame movable from stump to stump, a drum, an end plate secured to each end of the drum, a first drum support rotatably mounting one of the end plates on the frame, a second drum support rotatably mounting the other end plate on the frame, a rotary motor with a motor housing and an output shaft mounted substantially inside the drum, said motor having its motor housing anchored to the frame and its output shaft connected to the drum for rotating the drum relative to the frame, and a plurality of grinding tools connected to the outside surface of the drum.

2. The tree stump grinder of claim 1 wherein the frame is a yoke with two arms, the first drum support includes a stub shaft secured to one of the yoke arms and a bearing assembly rotatably mounting one end plate on the stub shaft, and wherein the motor housing is connected to the first drum support stub shaft.

3. The tree stump grinder of claim 2 wherein the second drum support is secured to the other yoke arm, and the other end plate of the drum is driven by the motor shaft and is rotatably mounted on the second drum support by a bearing.

4. The tree stump grinder of claim 1 wherein the grinding tools connected to the outside surface of the drum each includes a block having a bore and a bit with a shank portion that is held in the bore in the block by friction.

5. The tree stump grinder of claim 2 wherein the yoke is pivotally attached to a stick mounted on a vehicle and a hydraulic cylinder is connected to the yoke and the stick for pivoting the yoke relative to the stick.

6. The tree stump grinder of claim 5 further including an anchor assembly connected to the stick.

7. The tree stump grinder of claim 6 wherein the anchor assembly is pivotally connected to the stick and a hydraulic cylinder is connected to the anchor assembly for pivoting the anchor assembly relative to the stick.

8. A tree stump grinder for grinding tree stumps and tree roots in the ground including a vehicle movable from stump to stump, a boom pivotally attached to the vehicle, power means to pivot the boom relative to the vehicle, a stick pivotally attached to the boom, power means to pivot the stick relative to the boom, a yoke pivotally attached to the stick, a grinder drum with grinding bits thereon rotatably supported by the yoke, power means to pivot the yoke relative to the stick to cause the drum to move in grinding passes, an anchor assembly connected to the stick and operable to anchor the stick to the ground, stump, or roots during grinding of a tree stump, and a motor for driving said drum.

9. The tree stump grinder of claim 8 wherein the anchor assembly is pivotally connected to the stick and power means is connected to the anchor assembly for pivoting the anchor assembly relative to the stick.

10. The tree stump grinder of claim 8 wherein the grinder drum includes a first end plate, a first stub shaft rotatably mounting the first end plate on the yoke, a second end plate, and a second stub shaft rotatably mounting the second end plate on the yoke.

11. The tree stump grinder of claim 10 wherein the first stub shaft is connected to the yoke and the first end plate is rotatably journaled on the first stub shaft.

12. The tree stump grinder of claim 10 wherein said motor is a hydraulic motor mounted substantially inside the drum between the first end plate and the second end plate and connected to drive the drum.

13. The tree stump grinder of claim 12 including at least one passage through the first stub shaft for supplying hydraulic fluid to the hydraulic motor.

14. A tree stump grinder for grinding tree stumps and tree roots in the ground including a support member movable from stump to stump, a yoke pivotally attached to the support member, power means attached to the yoke and the support member and operable to pivot the yoke relative to the support member, a grinder drum rotatably mounted on the yoke, a motor attached to the yoke and operable to rotate the grinder drum, and an anchor assembly connected to the support member and operable to anchor the support member with relation to the ground and stump to cooperate with the grinder drum to grind tree stumps.

15. The tree stump grinder of claim 14 wherein the anchor assembly is pivotally attached to the yoke and including power means attached to the anchor assembly operable to pivot the anchor assembly relative to the yoke.

16. A method of grinding tree stumps in the ground with a vehicle having a frame, a boom assembly pivotally attached to the frame, power means to pivot the boom assembly relative to the frame, an anchor, a grinder drum attached to the boom assembly, power means carried by the boom assembly to move the grinder toward and away from the anchor, and power means to rotate the grinder drum, including the steps of:
 a. anchoring the boom assembly by one side of a tree stump by engaging it with the ground or stump;
 b. rotating the grinder drum, and
 c. moving the rotating grinder drum across a tree stump toward the anchor in repeated passes to grind the tree stump and other material between the anchor and the grinder drum.

17. The method of grinding tree stumps set forth in claim 16 wherein the tree stump is squeezed between the anchor and the grinder drum.

18. The method of grinding tree stumps set forth in claim 16 wherein the grinder drum and anchor are relatively moved to grip loose material such as large stones between them and the boom assembly is then moved to remove the gripped material to an out of the way location where the anchor and grinding drum are moved relatively to release the loose material.

19. The method of grinding tree stumps set forth in claim 16 including filling holes, made in the ground by the grinder drum, with the anchor after a tree stump has been ground down.

20. The method of grinding tree stumps set forth in claim 16 further including the steps of:
 d. moving the grinder drum away from the anchor following a pass of the grinding drum across a tree stump;
 e. resetting the anchor;
 f. moving the rotating grinder drum across a tree stump toward the anchor to grind additional material from the tree stump in another pass; and
 g. moving the grinder drum away from the anchor to allow the anchor to be reset for continued grinding of a tree stump if the tree stump is not completely ground.

* * * * *

UNITED STATES PATENT AND TRADEMARK OFFICE
CERTIFICATE OF CORRECTION

PATENT NO. : 5,158,126
DATED      : October 27, 1992
INVENTOR(S): William J. Lang It is certified that error appears in the above-identified patent and that said Letters Patent is hereby corrected as shown below:

Column 1, line 43, insert the following reference:

-- Russian Patent 908,283 --.

Column 5, line 29, after "required" insert a period;

line 57, after "position" insert a period.

Signed and Sealed this

Nineteenth Day of October, 1993

Attest:

BRUCE LEHMAN

Attesting Officer

Commissioner of Patents and Trademarks